(12) United States Patent
Wheeler et al.

(10) Patent No.: US 8,020,753 B2
(45) Date of Patent: Sep. 20, 2011

(54) REVOLUTION COUNTER FOR TURNING ASSEMBLIES

(75) Inventors: Scott R. Wheeler, Everett, WA (US); Dominic Baulier, Tecumseh (CA)

(73) Assignee: The Boeing Company, Chicago, IL (US)

( * ) Notice: Subject to any disclaimer, the term of this patent is extended or adjusted under 35 U.S.C. 154(b) by 612 days.

(21) Appl. No.: 12/243,382

(22) Filed: Oct. 1, 2008

(65) Prior Publication Data
US 2010/0078468 A1    Apr. 1, 2010

(51) Int. Cl.
G06M 1/22 (2006.01)
B23Q 16/06 (2006.01)
(52) U.S. Cl. ........................................................ 235/103
(58) Field of Classification Search .................. 235/103; 173/176–183; 606/1
See application file for complete search history.

(56) References Cited

U.S. PATENT DOCUMENTS

| 5,848,832 | A | * | 12/1998 | Hsieh | 362/119 |
| 5,930,742 | A | | 7/1999 | Dodd, Jr. et al. | |
| 6,965,835 | B2 | * | 11/2005 | McGee et al. | 702/41 |
| 2003/0173096 | A1 | * | 9/2003 | Setton et al. | 173/176 |
| 2009/0114067 | A1 | * | 5/2009 | Berg et al. | 81/468 |
| 2011/0004199 | A1 | * | 1/2011 | Ross et al. | 606/1 |

FOREIGN PATENT DOCUMENTS

GB          1463236         2/1977

OTHER PUBLICATIONS

Brochure of Red Lion Controls, York, PA, "Quadrature Output Rotary Pulse Generator" and "Quadrature Output Length Sensors", Effective May 2008.

Internet webpage of Red Lion Controls, York, PA "Shaft Encoders", printed from: http://www.redlion.net/Products/DigitalandAnalog/Sensors/ShaftEncoders.html, Jul. 31, 2008.
Internet webpage of Red Lion Controls, York, PA "Thru-Bore Encoders", printed from: http://www.redlion.net/Products/DigitalandAnalog/Sensors/Thu-BoreEncoders.html, Sep. 24, 2008.
Internet webpage of Red Lion Controls, York, PA "CUB5 Digital Counters", printed from: http://www.redlion.net/Products/DigitalandAnalog/Counters/CounterRate/CUB5.html, Sep. 24, 2008.
Internet webpage of Wikipedia, "Hubometer", printed from http://en.wikipedia.org/wiki/Hubometer, Jul. 31, 2008.
Internet webpage of McMaster-Carr, Robbinsiville, NJ, "Dial-Indicating Aluminum Hand Wheels," Catalog p. 2172, printed from http://www.mcmaster.com, Sep. 24, 2008.

\* cited by examiner

*Primary Examiner* — Thien M. Le
*Assistant Examiner* — Christle Marshall
(74) *Attorney, Agent, or Firm* — Ostrager Chong Flaherty & Broitman P.C.

(57) ABSTRACT

A preferred embodiment of a revolution counter tool and method employs an adapter shaft with input and output ends coupled in-line between a driven part and a driving part, and an intermediate portion between the input and output ends that is coupled to a rotary encoder and encoder circuit. A memory counter circuit maintains a count of turns and increments of the driven part by the driving part, and a reference setting circuit sets a reference setting of the memory counter circuit when a count is to be taken. The device body has a first portion mounting the adapter shaft with the rotary encoder, an intermediate housing containing the memory counter circuit, and a second portion at a distance from the first portion and of a sufficient mass that acts to orient the device body to a gravity-determined position as a reference position. The memory counter circuit receives output signals from the rotary encoder circuit and maintains a count relative to a reference setting using the reference position of the device body as indexed by gravity.

24 Claims, 6 Drawing Sheets

FIG.6 ately move one or more of these leading/trailing edge sections. If the control surfaces are run too far either in or out, the range of motion of the control surfaces during operational use may result in mechanical stops that can cause damage to the gearbox, resulting in the need to remove or repair the gearbox.

REVOLUTION COUNTER FOR TURNING ASSEMBLIES

TECHNICAL FIELD

This disclosure generally relates to a tool and associated method for keeping accurate count of the number of turns (and fractional increments thereof) that a driving part such as a wrench is used to drive or turn a driven part such as a shaft or gear. In particular, it is directed to a mechanical revolution counter for keeping track of the number of turns a driven part is driven for adjustment to a target or optimal position.

BACKGROUND

Existing rotation counters typically have a moving part that is clamped or fixed to a rotating shaft and a stationary part that is attached to or positioned in tandem with a non-rotating structure. A rotation sensor or rotary encoder is coupled between the two parts to count the number of turns of the moving part relative to the stationary part.

Some devices use a pendulum or weight to form the non-rotating part that stays in a downward position under gravity. For example, a hubometer is a well-known device that is mounted on the axle of a trailer or other towed vehicle for measuring the number of revolutions of the axle for conversion into a measure of distance traveled by the vehicle. The moving part of the device rotates with the axle or wheel relative to an eccentrically mounted weight on an internal shaft that remains pointing downwards as the rotating part of the hubometer rotates round it.

Other types of revolution counters have blind sensors that are designed to count the revolutions of a shaft or gear that is coupled to the driven part. One disadvantage with these prior types of devices is that the moving and/or stationary parts must be designed specifically to attach to the rotating structures the devices are used to measure.

In industrial applications, it is often desired to accurately count the number of turns (and fractional increments thereof) that a driven part is turned for adjustment to a target or optimal position. For example, in the aircraft industry, airplane wings commonly use telescopic plane surfaces to temporary increase wing surface and curvature during take-off and landing phases, and to increase lift effect at low speed. Both leading and trailing edges are equipped with extendable/retractable ancillary wing surfaces which are actuated by a single rotary motor connected to a chain of jack-screws linked/synchronized together by torque tubes. To insure mechanical axial compliance during wing flex or under ambient temperature variation, each torque tube for adjacent gearboxes is connected through a splined shaft. The synchronization of each gearbox to insure a true parallel movement of leading and trailing edges of the wing's main beam is dependent on an exact angular indexing of each gearbox input splined shaft. Initial installation as well as periodic maintenance task may require a temporary disconnection of one or more of these synchronization torque tubes in order to manually move one or more of these leading/trailing edge sections. If the control surfaces are run too far either in or out, the range of motion of the control surfaces during operational use may result in mechanical stops that can cause damage to the gearbox, resulting in the need to remove or repair the gearbox.

It is therefore desired to provide a revolution counter tool that can keep precise count of the number of turns/increments of angular indexing of a gearbox or motor-driven part so that it can always be returned to its optimal position during installation or repair, and even by a different mechanic. It is also desirable that the revolution counter tool be usable with different types of driven parts and different types of driving or turning parts, so that a special tool does not need to be designed individually for use with each type of application. As angular indexing movements may be made in either rotational direction, it is also important that the tool be bi-directional.

SUMMARY

In accordance with a preferred embodiment of the present disclosure, a revolution counter device, and associated method, for keeping track of a number of turns and increments thereof of a driven part by a driving part comprises:

an adapter shaft having an output end configured for coupling to a driven part that is to be rotated on a turning axis, and an input end configured for coupling to a driving part for rotating the driven part with the adapter shaft on the turning axis, and an intermediate portion in line between the input and output ends that is coupled to a rotary encoder;

a device body having a first portion for mounting said adapter shaft in engagement with the rotary encoder therein, said rotary encoder being coupled to the intermediate portion of said adapter shaft which is turned when the output end thereof is coupled to the driven part and turned by the input end coupled to the driving part, and having a rotary encoder circuit operatively coupled thereto for outputting signals indicative of the number of turns and increments of said adapter shaft detected by said rotary encoder, said device body further having a second portion, at a distance from the first portion, having a sufficient mass that said second portion acts to orient the device body to a gravity-determined position as a reference position that is indexed by gravity; and a memory counter circuit which receives output signals from said rotary encoder circuit and maintains a count indicative of a number of turns and increments of the driven part being turned by the driving part, said memory counter circuit including a reference setting circuit that sets a reference setting for a count using the reference position of the device body as indexed by gravity.

In a preferred embodiment, the device body has an intermediate housing connecting with the first portion which contains the memory counter circuitry. The adapter shaft has splined input and output ends that can be interfaced interchangeably with any matched driving part (such as a torque wrench or a nut runner) and driven part, and thus can be easily utilized with different kinds of wrenches and on different kinds of turning assemblies.

For use in the aircraft industry, the revolution counter tool can be used for keeping track of the number of revolutions of the torque tubes for installing or resetting slats or flaps of the wings of an airplane. The splined shaft of the tool can be plugged into any gearbox for the leading or trailing edges that run the control surfaces to keep track of how far a mechanic has moved a control surface so that it can be returned to the exact same location to re-align the control surface after rework or repairs are accomplished. This can prevent contact damage to the gearboxes for the control surfaces during operational use of the airplane and the attendant need for repair.

Other objects, features, and advantages of the various embodiments of the present disclosure will be explained in the following detailed description with reference to the appended drawings.

DETAILED DESCRIPTION

In the following detailed description, certain preferred embodiments for a revolution counter device are described to illustrate the principles of the disclosure in the specific application environment of adjusting control surfaces for flap positions in the aircraft industry. It will be recognized by one skilled in the art that the present disclosure may be practiced in other analogous applications or environments and/or with other analogous or equivalent variations of the illustrative embodiments. It should also be noted that those methods, procedures, components, or functions which are commonly known to persons of ordinary skill in the field of the invention are not described in detail so as avoid unnecessarily obscuring a concise description of the preferred embodiments.

Figure 1:
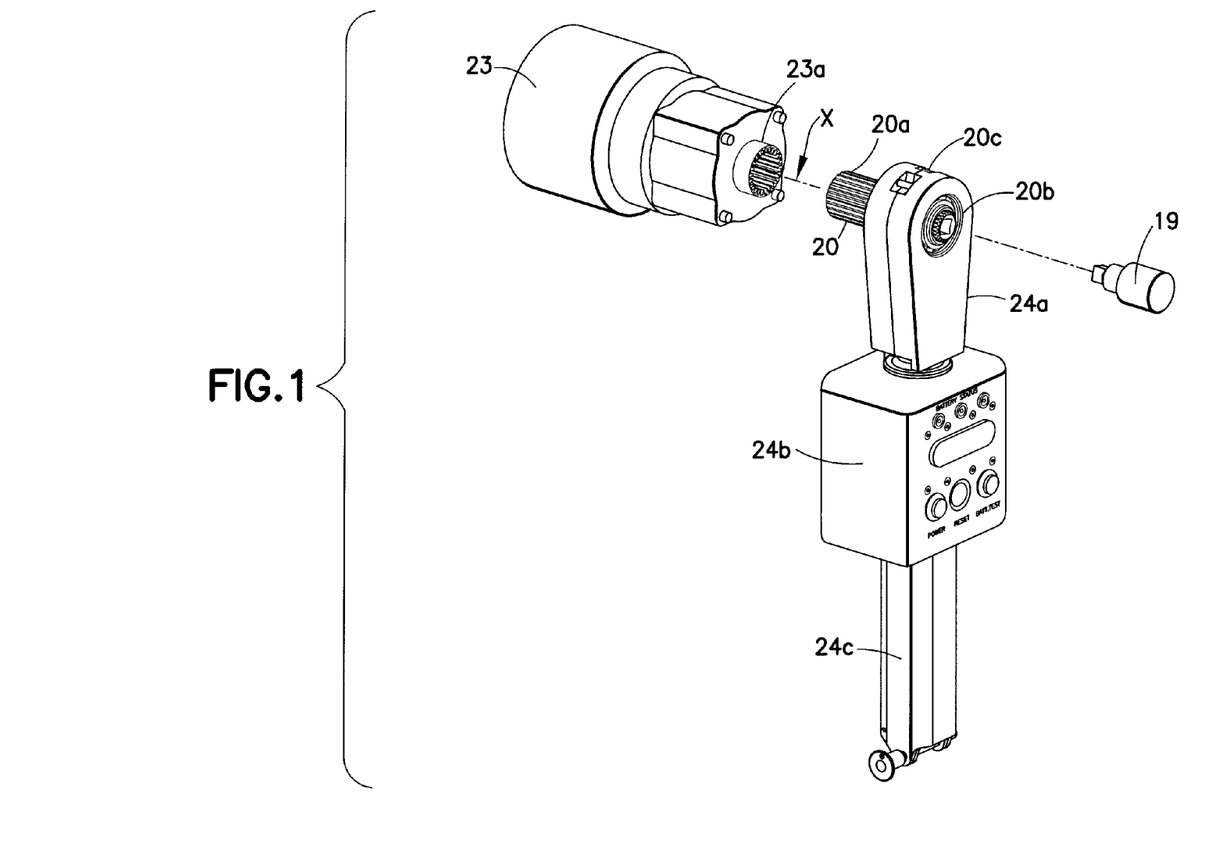
FIG. 1 is a diagram of a preferred embodiment of a Revolution Counter Tool having a splined shaft having input and output ends connected in-line between a driving part and a driven part of a turning assembly.

Referring to FIG. 1, a preferred embodiment of a Revolution Counter Tool is illustrated having a splined shaft 20 having an output end 20a adapted to be coupled to a driven part 23a of a power train system 23 for rotation on a turning axis X, and an input end 20b adapted to be coupled to a driving part 19 for rotating the driven part 23a with the splined shaft 20 on the turning axis X. The splined shaft 20 has a counter actuator section 20c in line between its input and output ends 20a, 20b that is coupled to a rotary encoder disc, as described in further detail below. The Tool has a device body in an elongated shape with a proximal end 24a which mounts the splined shaft 20 (and rotary encoder disc) for rotation when coupled in-line between the driving part 19 and the driven part 23. The proximal end 24a of the Tool further mounts a rotation sensor therein in proximity to the rotary encoder disc for detecting the turns and increments thereof, as described in further detail below. The device body for the Tool has an intermediate housing 24b contiguous with the proximal end 24a which contains electronic circuitry for the counter, display, and reset reference setting for the Tool. A distal end 24c of the Tool contains batteries for power supply for its electronic functions.

Figure 2:
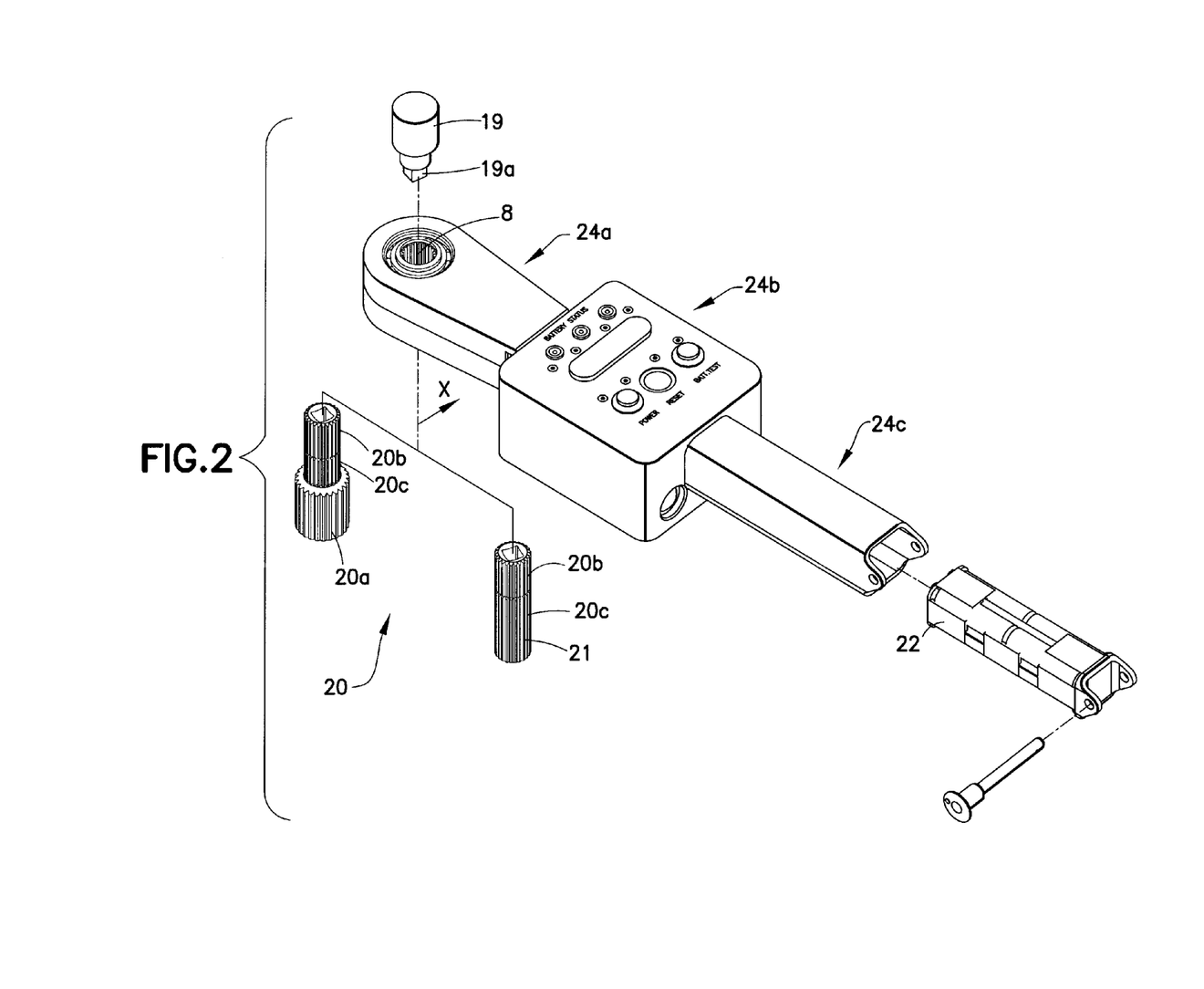
FIG. 2 shows the parts of the Revolution Counter Tool in further detail.
Figure 3:
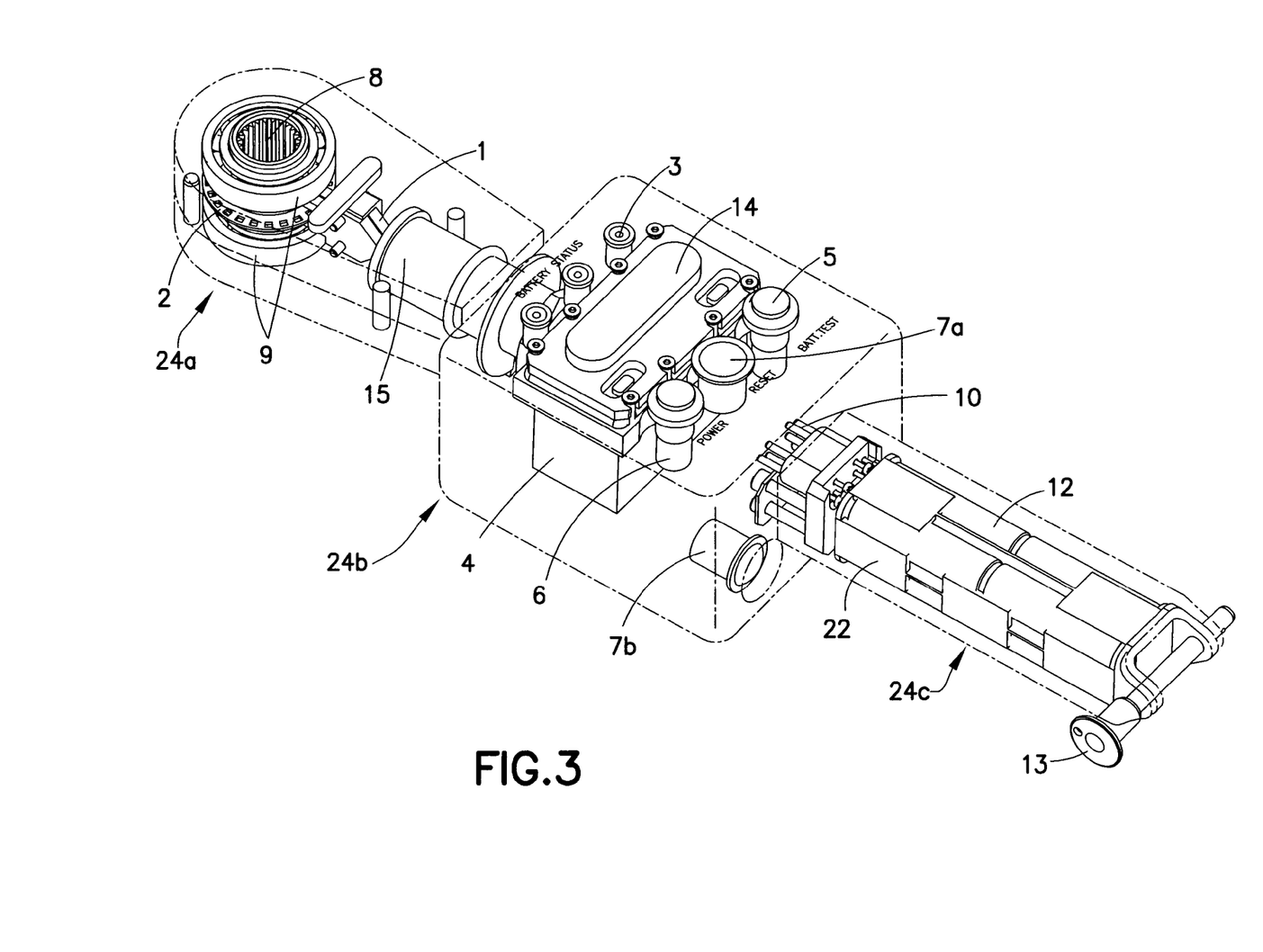
FIG. 3 shows a transparent isometric view of the Revolution Counter Tool with counter components in its housing.

In FIG. 2, the parts of the Revolution Counter Tool are shown in further detail. The splined shaft 20 may employ different splined adapter ends 20a on a stem end 21 to fit interchangeably into driven parts 23a of different gear patterns and diameters. Its input end 20b is configured to engage with the driving part 19. The input end 20b of the splined shaft 20 is shown in FIG. 3 as having a standard square-type female receptacle for a nut runner 19a of the driving part 19 which drives the whole turning assembly. The intermediate counter actuator portion 20c of the splined shaft 20 engages with the hub actuator part 8 that is coupled to the rotary encoder disc The distal end 24c of the Tool is shown having a slide-out battery holder 22 (such as for 8 AA size batteries) with retaining pin. The battery compartment at the distal end also serves as a handle for the Tool and a pendulum mass that allows the Tool to be used while placed in line between the driving part and the driven part.

FIG. 3 shows a transparent isometric view of the Tool with counter components in its housing (in phantom lines). Mounted in the proximal end 24a of the Tool are an optical rotation sensor 1, having a pair of sensor units side-by-side providing quadrature detection output signals, in combination with a rotary encoder disc 2 having a number (here, 25) of slot apertures at equidistant intervals around its periphery for demarcating corresponding angular increments (count resolution with quadrature signals: 25×4=100 increments). LED lights provide a visual display of a battery charge status for 2 different kinds of batteries. Arranged in the intermediate housing 24b is an incremental up/down pulse counter 4 which counts two pulse input signals (in quadrature) from the pair of optical rotation sensors 1. The counter 4 has a nonvolatile memory for retaining a count in process, and a digital LCD display 14 for providing a digital counter readout.

On a front display surface of the intermediate housing are an intermittent contact push button 5 for battery testing, a Reset intermittent contact push button 7a enabling resetting of the counter for a new count which is active only when the auxiliary Reset intermittent contact push-button 7b is activated too, and a Power On/Off latched contact push button 6. Operator mistake can be prevented by requiring the pressing simultaneously of an auxiliary Reset button 7b at the lower part of the housing facing the handle and the main reset push button 7a (Reset enable+Counter reset).

Hub actuator part 8, supported by a pair of bearing 9 (with low friction bunyl seal), engages the intermediate counter actuator portion 20c of the splined shaft 20 for coupling to the rotary encoder disc 2. Electrical connectors 10 provide power supply to the counter components from batteries 12 carried in the slide-out battery holder 22 retained by the battery pack locking detent pin 13. Rotary swivel joint 15 in-between the proximal and intermediate sections of the housing allow for adjustment of a counter display pivoting axis to offer the operator an ergonomic interface.

Figure 4:
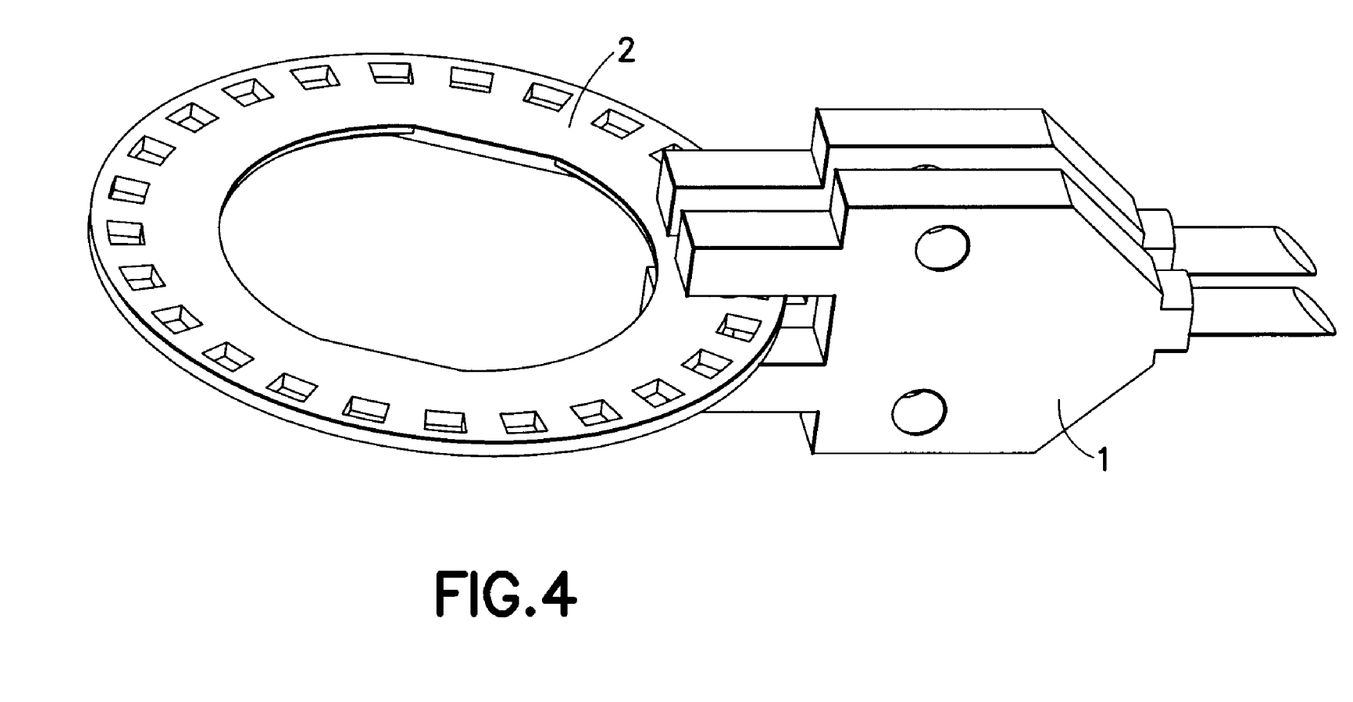
FIG. 4 shows a detailed view of the optical rotation sensor and encoder disc.

FIG. 4 shows a detailed view of the optical rotation sensor 1 with pair of sensor units and the rotary encoder disc 2 with its 25 trapezoidal apertures equally spaced along its outer perimeter. The two optical sensor units are mounted side to side so that their sensing light beams are alternately cut by a disc sector separating two consecutive apertures. The distance from sensor axis to sensor axis is set such that the signal generated by each sensor unit remains in perfect quadrature with each other (90 degree phase difference). This quadrature setting of the two sensor units allows two major benefits: detection of disc rotation direction for counting in up and down increments; and resolution multiplication by 4, by counting aperture transitions, allowing 4×25 (100) pulse generation per full revolution of the disc. This allows the counter to display a fractional revolution count to two significant decimals, without occurrence of increments by 0.02 that may periodically occur when a rounding function is use in combination with higher real increment count. The counter receives the rotation signal output in quadrature from the rotation sensor units relative to a reference setting of the zero position of the rotary encoder disc when the Reset button is pressed each time a new count is to be taken.

Figure 5:
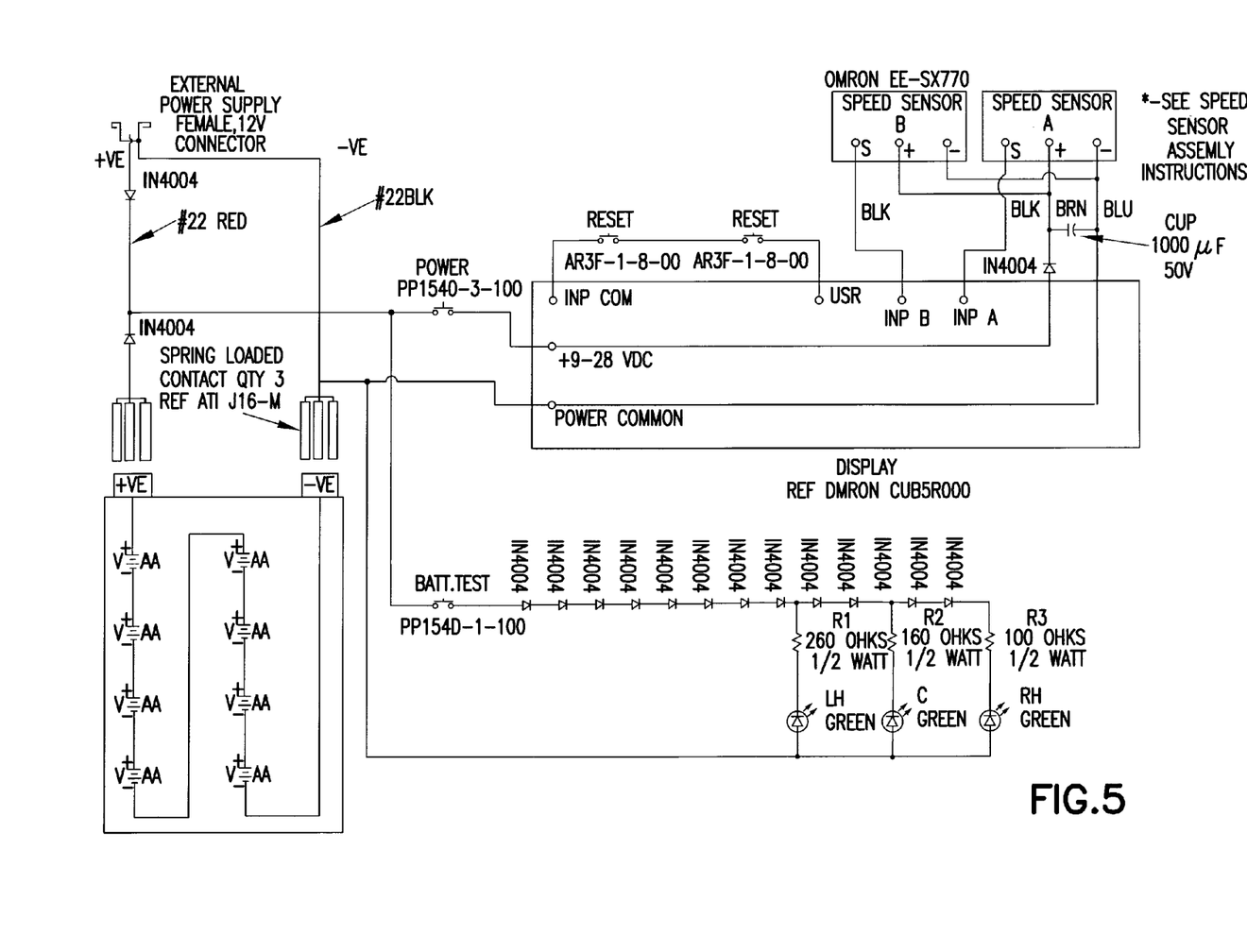
FIG. 5 is an electrical circuit diagram of the electrical components of the Tool.
Figure 6:
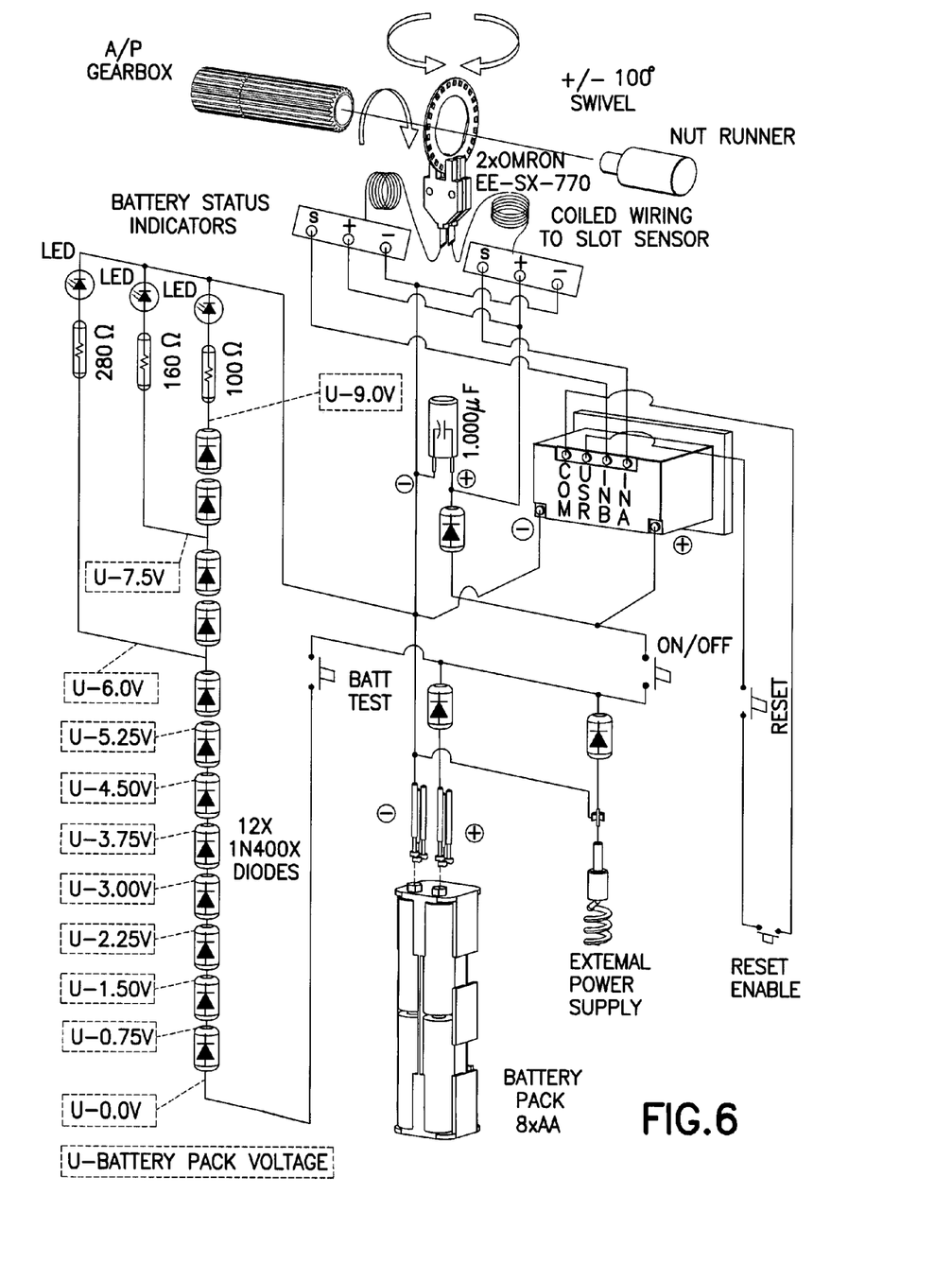
FIG. 6 is a layout diagram showing the interconnection of electrical components.

FIG. 5 is an electrical schematic diagram showing an example of circuitry for the counter components of the Tool. The two optical sensor units are represented by Speed Sensors A, B. The Reset buttons (numeral 7a, 7b in FIG. 3) are used to reset the reference position for the Speed Sensors to zero when a new count is to be taken. The counter is fed through an internal battery or external power supply (both protected by anti-feed-back diode). The two slot sensor units are fed power in parallel with the counter, but through a diode and with a 1,000 microFarad capacitance in parallel with both sensor units designed to keep them energized longer than the counter itself in case of battery exhaustion or power switch on/off. This would prevent a wrong counter increment due to a critical case of the counter seeing a sensor signal dropping and interpreting it as a rotation movement. The physical interconnection of these electrical components is shown in the electrical layout diagram of FIG. 6.

For operational use, the Tool is used as follows, as illustrated in FIG. 1. The user can press the Battery Test button and check that at least two battery status lights are lit. If one or fewer lights are lit, the batteries may be depleted or power source may not be connected. The user then inserts the output end of the splined shaft 20 into the gearbox where a rotation count is to be taken. The Tool should be left hanging in a vertical position by its own weight from the splined shaft and/or straps may be used to secure the device to an adjacent stable structure. The user then presses the Power button and waits for Tool to initialize. The user presses either of the Reset buttons to zero the counter a new count is to be taken. If a previous count is to be continued, the Reset button is not pressed. The driving part, such as a torque wrench, is connected to the input end of the Tool. The driving part is then operated to turn the splined shaft output end to the gearbox a desired number of turns clockwise or counterclockwise, and the count of the turns is displayed on the digital readout LCD with two significant decimals. Following use, the user presses the Power button to turn the Tool off for storage.

In a conventional rotation sensor, the rotary sensor body is typically indexed mechanically to the gearbox using a fixed bracket. The present embodiment of the Tool does not require mechanical attachment to a stationary gearbox, but rather is coupled in line between the driving and driven parts while the gravity mass (of the battery pack) at the free end of the tool ensures that the Tool is aligned in a vertical position with gravity when the revolution counter is to be reset to zero for the count. This gravity indexing with zero reset can obtain an accurate reading within $1/100$ revolution, or 2 significant decimal places. Even if the Tool may be jiggled during a reading, the sensor/counter will increment and decrement under the slight oscillation of the pendulum motion and will obtain a true reading value when pendulum motion is stopped in its final vertical position.

The Revolution Counter Tool as disclosed enables a user to couple the Tool in-line between a driving part and a driven part without any need for attachment to the surrounding chassis or structure. By using matching input and output ends for the splined shaft, the need to customize the structure of the Tool for each individual application environment is avoided. The Revolution Counter Tool uses gravity to maintain it in the vertical position as a position reference. The zero reset function enables the tool to set a precise zero reference position for the beginning of a new count no matter what position the Tool is in. The body of the Tool itself is designed as an "all in one" counter. The use of an encoder disc with quadrature signal output allows a precision count to be taken in increments up to $1/100$ of revolution (+/−2 degree). The Tool has a pivot axis adjustment which allows pivoting of the operator interface (display and control Push-buttons) from a standard straight position, without impacting the accuracy of the measurement, due to the design of its center of gravity of the housing coaxial with the swivel axis. The added circuit (diode with 1,000 micro Farad capacitor) to the power On/Off function insures a complementary feeding of the two optical slot sensor units so that the system is immunized from incidental power failure, power off, battery exhaustion, re-powering, etc.

For specific use with wing flap gearboxes in the aircraft industry, the Revolution Counter Tool has the flexibility to be used with a number of gearbox interfaces due to the modular/interchangeable splined shaft on the revolution counter hub. The counter interfaces to the gearbox to be measured only at the single point of the splined shaft, providing a great advantage in terms of space required and interface connect time, and attendant reduction in overall associated costs. The risks of damage by a foreign clamping system on a location not specifically designed for it or improper operation by a less experienced hand are also avoided. The "stand alone" or "all in one tool" also has further advantages of higher reliability (less risk of connector/cable-failure) and less risk of foreign objects being left inside of the airplane structure. The Tool will keep track of the number of revolutions of the torque tubes as the slats or flaps are moved and adjusted before the airplane has power on. The Tool can be adapted to plug into any wing flap gearbox on the leading or trailing edge that runs the control surfaces and keeps track of how far the mechanic has moved that surface so it can be returned to the exact same location to re-align it after rework or repair is accomplished.

Many modifications and variations may of course be devised given the above description of the principles of the disclosure. It is intended that all such modifications and variations be considered as within the spirit and scope of this disclosure, as defined in the following claims.

The invention claimed is:

1. A revolution counter device for counting a number of turns and increments thereof of a driven part by a driving part comprising:
   an adapter shaft having an output end configured for coupling to a driven part that is to be rotated on a turning axis, and an input end configured for coupling to a driving part for rotating the driven part with the adapter shaft on the turning axis, and an intermediate portion in line between the input and output ends that is coupled to a rotary encoder;
   a device body having a first portion for mounting said adapter shaft in engagement with the rotary encoder therein, said rotary encoder being coupled to the intermediate portion of said adapter shaft which is turned when the output end thereof is coupled to the driven part and turned by the input end coupled to the driving part, and having a rotary encoder circuit operatively coupled thereto for outputting signals indicative of the number of turns and increments of said adapter shaft detected by said rotary encoder, said device body further having a second portion, at a distance from the first portion, having a sufficient mass that said second portion acts to orient the device body to a gravity-determined position as a reference position that is indexed by gravity; and
   a memory counter circuit which receives output signals from said rotary encoder circuit and maintains a count indicative of a number of turns and increments of the driven part being turned by the driving part, said memory counter circuit including a reference setting circuit that sets a reference setting for a count using the reference position of the device body as indexed by gravity.

2. A revolution counter device according to claim 1, wherein said device body further comprises an intermediate housing connecting between said first and second portions which contains said memory counter circuit.

3. A revolution counter device according to claim 1, wherein said second portion of said device body contains a battery pack for supplying power to the device components that acts as a gravity mass for orienting the device body in the gravity-determined position as the reference position to be used by said memory counter circuit.

4. A revolution counter device according to claim 1, wherein said adapter shaft has splined input and output ends which are interchangeable so that they can be interfaced with any matched driving part and driven part.

5. A revolution counter device according to claim 2, wherein said first portion of said device body has a pivotable coupling to said intermediate housing for adjusting a desired operator interface orientation.

6. A revolution counter device according to claim 2, wherein said memory counter circuit includes a protective circuit for maintaining a count immune from a power On/Off event.

7. A revolution counter device according to claim 1, wherein said rotary encoder circuit has a pair of rotation sensor units arranged in tandem for providing output signals in quadrature, and said rotary encoder has an encoder disc having at least 25 encoder apertures for counting with quadrature output signals of at least 100 pulses per revolution of the disc.

8. A revolution counter device according to claim 1, wherein said reference setting circuit includes a pair of Reset push buttons which are required to be actuated simultaneously to prevent operator error in activating the reference setting function.

9. A revolution counter device according to claim 1, wherein the input end of said adapter shaft has a square female receptacle for receiving a nut runner of a torque wrench as the driving part.

10. A revolution counter device according to claim 2, wherein said device body is coupled in-line between the driven and driving parts only by said adapter shaft mounted in the first portion thereof, while said intermediate housing and said second portion are unattached to any other part and constitute a free mass for gravity indexing.

11. A revolution counter device according to claim 1, wherein said rotary encoder circuit is adapted to maintain a count of turns and increments thereof in both the clockwise and counterclockwise directions.

12. A rotation counting method for counting a number of turns and increments thereof of a driven part by a driving part comprising:
providing an adapter shaft in a device body for coupling in-line between a driven part and a driving part;
coupling an intermediate portion of the adapter shaft to a rotary encoder contained in the device body, and providing a rotary encoder circuit operatively coupled to the rotary encoder for outputting signals indicative of a number of turns and increments of the adapter shaft detected by the rotary encoder;
enabling a free mass of the device body to be used to orient the device body to a gravity-determined position relative to the adapter shaft as a reference position that is indexed by gravity;
providing a memory counter circuit which receives output signals from the rotary encoder circuit and maintains a count indicative of the number of turns and increments that the driven part is being turned by the driving part, and
enabling the memory counter circuit to set a reference setting for the count using the reference position of the device body as indexed by gravity.

13. A rotation counting method according to claim 12, wherein the device body is provided with a first portion which mounts the adapter shaft with the rotary encoder, an intermediate housing which contains the memory counter circuit, and a second portion at a distance from the first portion and connected thereto by the intermediate housing which acts as a free mass for gravity indexing.

14. A rotation counting method according to claim 13, wherein the second portion of the device body contains a battery pack for supplying power to the device components that acts as a gravity mass for orienting the device body in the gravity-determined position as the reference position to be used by the memory counter circuit.

15. A rotation counting method according to claim 12, wherein the adapter shaft is provided with interchangeably splined input and output ends that can be interfaced with any matched driving part and driven part.

16. A rotation counting method according to claim 12, wherein the rotation encoder circuit has a pair of rotation sensor units in tandem for providing output signals in quadrature, and said rotary encoder has an encoder disc having at least 25 encoder apertures for enabling counting with quadrature output signals of at least 100 pulses per revolution of the disc.

17. A rotation counting method according to claim 13, wherein the rotary encoder circuit is adapted to maintain a count of turns and increments thereof in both the clockwise and counterclockwise directions.

18. A rotation counting method according to claim 13, wherein the device body is coupled in-line between the driven and driving parts only by the adapter shaft mounted in the first portion thereof, while the intermediate housing and second portion are unattached to any other part and constitute a free mass for gravity indexing.

19. A rotation counting method according to claim 12, wherein setting the reference setting of the memory counter circuit requires actuating a pair of Reset push buttons simultaneously to prevent operator error in activating the reference setting function.

20. A rotation counting method according to claim 12, wherein the memory counter circuit is provided with a protective circuit for maintaining a count immune from a power On/Off event.

21. A revolution counter device for counting a number of turns and increments thereof of a driven part by a driving part comprising:
an adapter shaft having an output end configured for coupling to a driven part that is to be rotated on a turning axis, and an input end configured for coupling to a driving part for rotating the driven part with the adapter shaft on the turning axis, and an intermediate portion in line between the input and output ends that is coupled to a rotary encoder;
a device body having a first portion for mounting said adapter shaft in engagement with the rotary encoder therein, said rotary encoder being coupled to the intermediate portion of said adapter shaft which is turned when the output end thereof is coupled to the driven part and turned by the input end coupled to the driving part, and having a rotary encoder circuit operatively coupled thereto for outputting signals indicative of a number of turns and increments of said adapter shaft detected by said rotary encoder, said device body further having an intermediate housing for containing a memory counter circuit therein, and a second portion, at a distance from the first portion and connected thereto by said intermediate housing, having a sufficient mass that said second portion acts to orient the device body to a gravity-determined position as a reference position that is indexed by gravity; and a memory counter circuit which receives output signals from said rotary encoder circuit and maintains a count indicative of a number of turns and increments of the driven part being turned by the driving part, said memory counter circuit including a zero reference setting circuit that sets a zero reference setting for a count using the reference position of the device body as indexed by gravity.

22. A revolution counter device according to claim 21, wherein said second portion of said device body contains a battery pack for supplying power to the device components that acts as a gravity mass for orienting the device body in the gravity-determined position as the reference position to be used by said memory counter circuit.

23. A revolution counter device according to claim 21, wherein said adapter shaft has splined input and output ends which are interchangeable so that they can be interfaced with any matched driving part and driven part.

24. A revolution counter device according to claim 23, wherein said output end of said adapter shaft is configured for coupling to a gearbox assembly for setting a desired position for a wing flap of an airplane, and said input end is configured for coupling to a mechanic's wrench, and said revolution counter device is used to keep track of the number of turns and increments thereof a mechanic has turned the wrench to set the desired position for the wing flap, so that it can be returned to the exact same position after rework or repair.

\* \* \* \* \*